(12) United States Patent
Heffez

(10) Patent No.: US 8,370,909 B2
(45) Date of Patent: Feb. 5, 2013

(54) METHOD AND SYSTEM FOR AUTHENTICATING INTERNET USER IDENTITY

(76) Inventor: Guy Heffez, New York, NY (US)

( * ) Notice: Subject to any disclaimer, the term of this patent is extended or adjusted under 35 U.S.C. 154(b) by 0 days.

(21) Appl. No.: 12/600,808

(22) PCT Filed: May 29, 2007

(86) PCT No.: PCT/US2007/012552
§ 371 (c)(1),
(2), (4) Date: Nov. 18, 2009

(87) PCT Pub. No.: WO2008/147353
PCT Pub. Date: Dec. 4, 2008

(65) Prior Publication Data
US 2010/0153733 A1    Jun. 17, 2010

(51) Int. Cl.
*G06F 7/04* (2006.01)
*G06Q 30/00* (2012.01)

(52) U.S. Cl. ............. 726/5; 726/2; 726/3; 726/4; 726/7; 705/64; 705/67; 705/14.23; 705/14.51

(58) Field of Classification Search ........................ None
See application file for complete search history.

(56) References Cited

U.S. PATENT DOCUMENTS

| | | | |
|---|---|---|---|
| 6,466,779 B1 | 10/2002 | Moles et al. | |
| 7,376,431 B2 | 5/2008 | Niedermeyer | |
| 7,673,032 B1 * | 3/2010 | Augart | 709/223 |
| 2001/0034718 A1 | 10/2001 | Shaked et al. | |
| 2002/0016831 A1 | 2/2002 | Peled et al. | |
| 2002/0035622 A1 * | 3/2002 | Barber | 709/220 |
| 2002/0053018 A1 * | 5/2002 | Ota et al. | 713/1 |
| 2002/0188712 A1 | 12/2002 | Caslin et al. | |
| 2003/0056096 A1 | 3/2003 | Albert et al. | |
| 2003/0101134 A1 | 5/2003 | Liu et al. | |
| 2003/0134648 A1 | 7/2003 | Reed et al. | |
| 2003/0187800 A1 | 10/2003 | Moore et al. | |
| 2004/0081109 A1 | 4/2004 | Oishi | |
| 2004/0111640 A1 | 6/2004 | Baum | |
| 2005/0159173 A1 | 7/2005 | Dowling | |
| 2005/0160280 A1 | 7/2005 | Caslin et al. | |
| 2005/0180395 A1 | 8/2005 | Moore et al. | |
| 2005/0198218 A1 * | 9/2005 | Tasker et al. | 709/220 |
| 2006/0031830 A1 * | 2/2006 | Chu et al. | 717/174 |
| 2008/0046988 A1 * | 2/2008 | Baharis et al. | 726/7 |
| 2008/0146193 A1 * | 6/2008 | Bentley et al. | 455/411 |
| 2008/0189776 A1 * | 8/2008 | Constable | 726/7 |

FOREIGN PATENT DOCUMENTS

IL      WO2004079499 A2      9/2004

\* cited by examiner

*Primary Examiner* — Ashok Patel
*Assistant Examiner* — Alexander Lagor
(74) *Attorney, Agent, or Firm* — Gotham Patent Services LLC; James P. Demers

(57) ABSTRACT

A method and system for authenticating an Internet user identity by cross-referencing and comparing at least two independent sources of information. A first geographical location of computer signature of an internet user is identified and the geographical location of a communication voice device of said internet user is identified to determine a second location. The first and second locations are compared for geographical proximity to confirm the identity of the internet user. Based upon geographical proximity of said locations, a score is assigned to the internet user, and access to a website is allowed or limited based upon said score. Alternatively, additional authentication information can be required or access can be terminated.

35 Claims, 1 Drawing Sheet

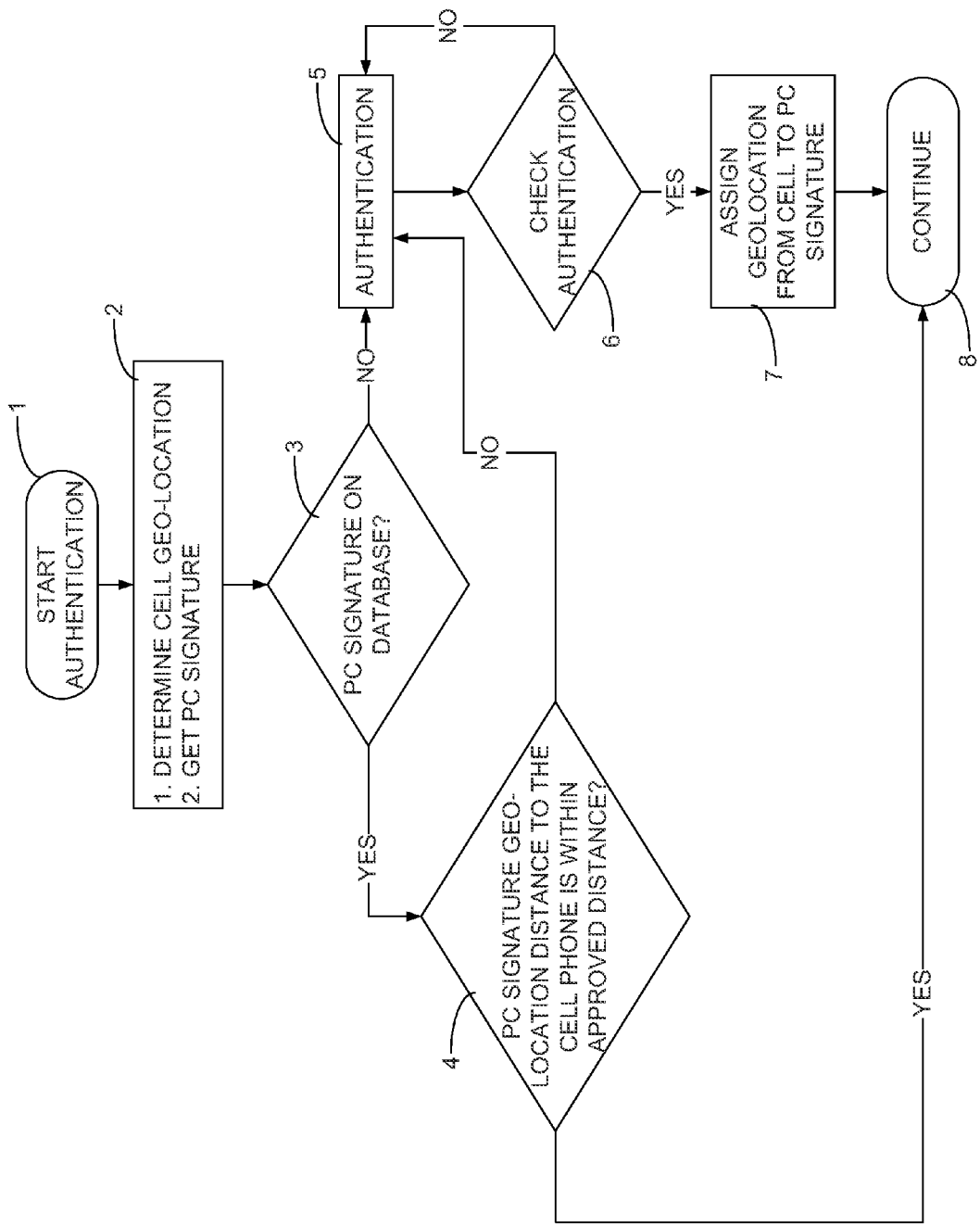

METHOD AND SYSTEM FOR AUTHENTICATING INTERNET USER IDENTITY

CROSS-REFERENCE TO RELATED APPLICATIONS

None.

TECHNICAL FIELD

This invention relates to Internet user identification. More specifically it relates to using computer characteristics to identify an internet user. Even more specifically it relates to using characteristics of the user's computer and a cell phone location to identify the user.

BACKGROUND ART

The invention relates to a method and system for authenticating Internet user identity, and more particularly, to a method and system for authenticating internet user identity by cross-referencing the geographical location of a internet user's Communication voice device, such as a mobile voice device, a Voice over Internet Protocol (hereinafter VoIP) telephone or non-mobile telephone, and the geographical location of the computer signature.

Computer signature can be set of one or more hardware devices information, unlimited example the gateway Mac address, the computer Mac address, CPU serial number and more. The computer signature can also be set of one or more software components. Unlimited example—the operating system serial number, cookie, combination of few software's versions etc' hereinafter (computer signature)

The use of the internet has become a common a popular arena for the sale of goods and services. Such sales require the transmission of personal and confidential data belonging to the buyer of such goods and services. Such information is often the target of identity theft. In response to the increase in the opportunity for the commission of fraud through identity theft, sellers and providers of goods and services through the internet require a method whereby such fraud can be reduced.

With respect to internet usage, upon accessing the internet, an internet user's computer is identified with an IP address, it should be understood that Internet Protocol Address (hereinafter "IP Address") means any internet communication protocol such as but not limited to IPV4 and IPV6. And whenever the internet user enters a website, the internet user's IP address is identified to the website owner. Such identified IP addresses can be traceable geographically to its source so as to determine the location (state and city) of the internet user, in some cases the IP address can be traced to a radius of a few miles from its source. The comparison of the geographical location of the internet user computer signature, with the geographical location of said internet user Communication voice device can provide the seller or provider a means to authenticate the identify of the Internet user.

United States Pat. App. Pub. No. 2001/0034718 A1 to Shaked et al. discloses a method of controlling access to a service over a network, including the steps of automatically identifying a service user and acquiring user information, thereby to control access. Additionally, a method of providing service over a network, in which the service requires identification of a user, including the steps of automatically identifying the user and associating the user with user information, thus enabling the service, is disclosed.

U.S. Pat. No. 6,466,779 to Moles et al. discloses a security apparatus for use in a wireless network including base stations communicating with mobile stations for preventing unprovisioned mobile stations from accessing an internet protocol (IP) data network via the wireless network.

United States Pat. App. Pub. No. 2002/0188712 A1 to Caslin et al. discloses a fraud monitoring system for a communications system. The fraud monitoring system analyzes records of usage activity in the system and applies fraud pattern detection algorithms to detect patterns indicative of fraud. The fraud monitoring system accommodates both transaction records resulting from control of a packet-switched network and those from a circuit-switched network gateway.

United States Pat. App. Pub. No. 2003/0056096 A1 to Albert et al. discloses a method to securely authenticate user credentials. The method includes encrypting a user credential with a public key at an access device. The public key is part of a public/private key pair suitable for use with encryption algorithm. The decrypted user credential is then transmitted from the decryption server to an authentication server for verification. The decryption server typically forms part of a multi-party service access environment including a plurality of access providers. This method can be used in legacy protocols, such as Point-to-Point Protocol (PPP), Password Authentication Protocol (PAP), Challenge-Handshake Authentication Protocol (CHAP), Remote Authentication Dial in User Server (RADIUS) protocol, Terminal Access Controller Access Control System (TACAS) protocol, Lightweight Directory Access Protocol (LDAP), NT Domain authentication protocol, Unix password authentication protocol, Hypertext Transfer Protocol (HTTP), Hypertext Transfer Protocol over Secure sockets layer (HTTPS), Extended Authentication Protocol (EAP), Transport Layer Security (TLS) protocol, Token Ring protocol, and/or Secure Remote Password protocol (SRP).

United States Patent Application Publication Number US 2003/0101134 A1 published to Liu et al. on May 29, 2003 teaches a method for transaction approval, including submitting a transaction approval request from a transaction site to a clearing agency; submitting a user authorization request from the clearing-agency to a user device; receiving a response to the user authorization request; and sending a response to the transaction approval request from the clearing agency to the transaction site. Another method for transaction approval includes: submitting a transaction approval request from a transaction site to a clearing agency; determining whether a trusted transaction is elected; submitting a user authorization request from the clearing agency to a user device if a trusted transaction is determined to be elected; receiving a response to the user authorization request from the user device if the user authentication request was submitted; and sending a response to the transaction approval request from the clearing agency to the transaction site. A system for transaction approval includes a clearing agency for the transaction approval wherein the clearing agency having a function to request for user authorization, a network operatively coupled to the clearing agency, and a user device adapted to be operatively coupled to the network for trusted transaction approval.

United States Patent Application Publication Number US 2003/0187800 A1 published to Moore et al. on Oct. 2, 2003 teaches systems, methods, and program products for determining billable usage of a communications system wherein services are provided via instant communications. In some embodiments, there is provided for authorizing the fulfillment of service requests based upon information pertaining to a billable account.

United States Patent Application Publication Number US 2004/0111640 A1 published to Baum on Jun. 10, 2004 teaches methods and apparatus for determining, in a reliable manner, port, physical location, and/or device identifier, such as a MAC address, associated with a device using an IP address and for using such information, e.g., to support one or more security applications. Supported security applications include restricting access to services based on the location of a device seeking access to a service, determining the location of stolen devices, and authenticating the location of the source of a message or other IP signal, e.g., to determine if a prisoner is contacting a monitoring service from a predetermined location.

United States Patent Application Publication Number US 2005/0159173 A1 published to Dowling on Jul. 21, 2005 teaches methods, apparatus, and business techniques for use in mobile network communication systems. A mobile unit, such as a smart phone, is preferably equipped with a wireless local area network connection and a wireless wide area network connection. The local area network connection is used to establish a position-dependent, e-commerce network connection with a wireless peripheral supplied by a vendor. The mobile unit is then temporarily augmented with the added peripheral services supplied by the negotiated wireless peripheral. Systems and methods allow the mobile unit to communicate securely with a remote server, even when the negotiated wireless peripheral is not fully trusted. Also included are mobile units, wireless user peripherals, and negotiated wireless peripherals projecting a non-area constrained user interface image on a display surface.

United States Patent Application Publication Number US 2005/01602.80 A1 published to Caslin et al. on Jul. 21, 2005 teaches providing fraud detection in support of data communication services. A usage pattern associated with a particular account for remote access to a data network is monitored. The usage pattern is compared with a reference pattern specified for the account. A fraud alert is selectively generated based on the comparison.

United States Patent Application Publication Number US 2005/0180395 A1 published to Moore et al. on Aug. 18, 2005 teaches an approach for supporting a plurality of communication modes through universal identification. A core identifier is generated for uniquely identifying a user among a plurality of users within the communication system. One or more specific identifiers are derived based upon the core identifier. The specific identifiers serve as addressing information to the respective communication modes. The specific identifiers and the core identifier are designated as a suite of identifiers allocated to the user.

While these systems may be suitable for the particular purpose employed, or for general use, they would not be as suitable for the purposes of the present invention as disclosed hereafter.

DISCLOSURE OF THE INVENTION

It is an object of the invention to produce a means to decrease the potential for fraud through authentication of the identity of an internet user. Accordingly, this method provides for authenticating the identity of the internet user or purchaser (hereinafter "internet user") through cross-referencing and comparison of at least two independent sources of information, such as, but not limited to, the internet user's computer signature geographical location and the geographical location of a Communication voice device associated with said internet user.

It is another object of the invention to provide a means for providing an accurate geographical location of the Internet user and the internet user's computer signature.

It is another object of the invention to provide a convenient means for determining the location of internet users at both mobile and non-mobile Communication voice devices and terminals. Accordingly, this method includes the utilization systems and software that are used to locate the geographical location of people or Communication voice devices, such as, but not limited to Global Positioning Systems (GPS), Galileo, WiMax, WiFi, RFID and external positioning apparatus, such as, but not limited to, cellular base stations and antennas.

It is another object of the invention to provide a convenient means for determining a more accurate geographical location of routers using the internet user Communication voice device's geographical location and the said user computer signature.

This invention is a method and system for authenticating an internet user identity by cross-referencing and comparing at least two independent sources of information. A first computer signature of an internet user is identified. The geographical address of a communications device of said internet user is traced to determine a second location. The first and second locations are compared for geographical proximity to confirm the identity of the internet user. Additionally, depending on the geographical proximity of the first and second location, a positive or negative score may be assigned to the internet user, and access to the website and the ability to conduct transactions may be allowed or limited based on the assigned score. Alternatively, additional authentication information may be required of the internet user in order to proceed with the online transaction, or access by the internet user may be terminated.

A computer signature is created by identifying certain characteristics of the computer. These characteristics act as identifiers of the computer. Every computer that is connected to the Internet has few unique identifiers such as but not limited to: Computer Network Mac address, CPU serial number, Operating System S/N. and more. In addition to the above the computer uses other network resources that have unique identifiers such as but not limited to a Gateway or Router Mac Address. In addition to the above every computer has common identifiers such as but not limited to: Operating system version, Disk Size, Internet browser version, hardware installed on the computer, network card speed, Operating system patches installed on the computer, CPU speed, memory size, cookie, secret cookie, virtual memory size, other installed software on the computer and more. Using one or more then one common identifiers together it is possible to create one unique computer signature for any given computer.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a flow chart of the method and system of the present invention.

BEST MODE FOR CARRYING OUT THE INVENTION

This invention relates to a method and system for authenticating Internet user identity by cross-referencing or comparing at least two independent sources of information, identifying at least two geographical locations. Based upon geographical proximity of said locations, a score is assigned to the internet user, and predetermined access to a website and an ability to conduct transactions is allowed or limited based upon said score. Alternatively, additional authentication information can be required or access can be terminated. The invention is also a convenient means for determining a more accurate geographical location of routers.

FIG. 1 illustrates a method for authenticating internet user identity by cross-referencing and comparing at least two independent sources of information. In step 1, an internet user starts authentication. Then, in step 2, the online entity locates the geographic location of the Internet user's cell phone and checks the user's computer signature. In step 3, the online entity looks for the computer signature in a database. If the computer signature is discovered, the method proceeds to step 4. In step 4, the online entity compares the distance between the geographic location of the computer defined by the computer signature and the geographic location of the user's cell phone. If the distance is acceptable, the authentication process continues at step 8. If the distance is not acceptable, the method goes to step 5.

If the computer signature is not in the database, the method also continues to step 5. In step 5, the online entity attempts to authenticate the computer by other means. In step 6, the authentication is confirmed. If the authentication is acceptable, the method continues to step 7. If the authentication is not acceptable, the method returns to step 5 and repeats step 5.

If the authentication is acceptable, continues to step 7 assigning the geographic location of the user's cell phone to the computer signature and saving it in the database. The method then continues with the authentication in step 8.

Referring to FIG. 1, the method starts when the online entity decides to authenticate the internet user accessing a website and provides information, as in steps 1 and 2. The website vendor then decides to authenticate internet user identity, based on the information provided by the internet user, as shown in step 3. What information will trigger the decision to authenticate the identity of the internet user will vary among vendors employing the method described herein. For purposes of clarity, the term vendor will be used hereafter and it should be understood that vendor means any business, organization or commercial entity which conducts on-line commercial transactions through a website on the internet, such as, but not limited to, banking institutions, on-line stores or other commercial or none commercial entities.

Upon accessing a website, in step 2, the computer signature will be identified. The invention is not limited to a conventional computer, but may include terminals, smart phones (PDA's) or other devices capable of communicating with the internet. Whenever the internet user enters a website, the internet user's computer signature is identified for a website owner.

A computer signature is created by identifying certain characteristics of the computer. These characteristics act as identifiers of the computer. Every computer that connected to the Internet has few unique identifiers. Using one, or more then one, common identifiers together it is possible to create one unique computer signature. These identifiers are selected from the list of Computer Network Mac address, CPU serial number, Operating System S/N. and more. In addition to the above the computer uses other network resources that have unique identifiers such as but not limited to a Gateway or Router Mac Address. In addition to the above every computer has common identifiers such as but not limited to: Operating system version, Disk Size, Internet browser version, hardware installed on the computer, network card speed, Operating system patches installed on the computer, CPU speed, memory size, virtual memory size, other installed software on the computer and more. A person skilled in the art will see that other computer characteristics could be used as identifiers to create a computer signature.

The vendor will then request from the internet user a contact number for a communications voice device, which is accessible to the internet user at the internet user's current location. Communication voice device, as used in the context of the present invention, applies to any voice device capable of communicating with another voice device such as, but not limited to, phone, mobile voice device, VoIP telephone or personal digital assistant (hereinafter PDA). Other non-limiting examples include any device that has been modified or designed for voice or text communication. A geographical location for the communication voice device is then traced, as stated in step 2.

It should be understood that the term "mobile voice device", as used in the context of the present invention, applies to any mobile device modified or designed for voice or text communication and capable of communicating with another device via wireless network such as but not limited to cellular system, radio system, WiFi, WiMax, RFID, BLUETOOTH (short wavelength radio transmissions), MIMO, UWB (Ultra Wide Band), satellite system or any other such wireless networks known now or in the future.

Other non-limiting examples include any device that has been modified or designed to communicate with a web-ready PDA, a Blackberry, a laptop computer with cellular connect capability, or a notification server, such as email server:

The geographical location of a telephone can be traced using any one of existing databases. As a non-mobile telephone is attached to a single physical location, the location is available using various existing databases. A Voice over Internet Protocol (hereinafter VoIP) telephone is connected to high-speed internet access such as T1, DSL, cable modems, or other available internet connection systems. A VoIP location is available using various databases. A VoIP connection provider company can provide the IP address to which such VoIP telephone is connected such that the geographical location of the internet user is traceable to the IP address.

The geographical location of a mobile voice device can be traced using technology such as, but not limited to, Galileo, GPS, cellular antenna network, phone antenna, WiFi, BLUETOOTH (short wavelength radio transmissions), MIMO, UWB, WiMax, etc.

A cellular telephone location system for automatically recording the location of one or more mobile cellular telephones is described, for example, in U.S. Pat. No. 5,327,144. The system comprises a central site system operatively coupled to at least three cell sites. Each of the cell sites receives cellular telephone signals and integrates a timing signal common to all the cell sites. The central site calculates differences in times of arrival of the cellular telephone signals arriving among the cell sites and thereby calculates the position of the cellular telephone producing the cellular telephone signals. Additional examples of known methods for locating phones are cell sector and cell site.

The position of an internet user's mobile voice device can be determined by, for example: (a) an internal positioning apparatus such as a Global Positioning System (hereinafter GPS) receiver built into the mobile voice device that receives GPS radio signals transmitted from GPS satellites; and (b) an external positioning apparatus such as a cellular positioning system that computes the position of the mobile voice device by observing time differences among the arrivals of a radio signal transmitted by the mobile voice device at a plurality of observation points, i.e., base stations. The operation of the GPS is well-known and will not be described further herein.

Next, the geographical location of the IP address of the internet user is traced, as stated in step 2. Such an IP address can be traced geographically to its source so as to determine the location (state and city) of the internet user. In some cases the system used to trace the IP address can be so accurate that it can identify a street and house number of the internet user.

Another means for obtaining the geographical location of the internet user's computer signature, the internet user's ISP can be contacted to request a full address from where the internet user is connected. For example, a modem dial-up internet user is assigned a unique computer signature by their ISP. After the internet user enters a username and password the ISP knows from which phone number that internet user called and can trace a contacting number to a geographical location.

The present invention includes a method of locating a router's geographical location based on the computer signature geographical location. In addition, the invention includes a method of geographically comparing the user communication voice device and the computer signature. All of the methods may utilize a communication voice device that is either non-mobile telephone, a mobile telephone or a mobile voice device.

Since the following is known:
1. The geographical location of the user's computer signature.
2. The routing table between the vendor internet web site and the internet user.

Then, the vendor can locate the geographical location of the closest public router to the internet user computer signature. Since the first public router that the internet user is using is close geographically to the internet user computer signature.

It is to be understood that the present invention is not limited to the embodiments described above, but encompasses any and all embodiments under the doctrine of equivalents.

In conclusion, herein is presented a method and system for authenticating internet user identity. The invention is illustrated by example in the drawing figures, and throughout the written description. It should be understood that numerous variations are possible, while adhering to the inventive concept. Such variations are contemplated as being a part of the present invention.

INDUSTRIAL APPLICABILITY

This invention can be used for any purpose that is related to internet security, internet commerce and internet user identification. The invention is specifically envisioned as an improvement over existing log-in methods and purchases identification methods, but a person skilled in the art will recognize other applications.

What is claimed is:

1. A computer-implemented method of authenticating an Internet user's identity, the method comprising the computer-implemented steps of:
    a) identifying, while an Internet user is communicating with an Internet website of an Internet vendor, a computer signature of a computer being used by the Internet user, comprising one or more common identifiers, wherein:
        i) each common identifier of the one or more common identifiers comprises a non-unique identifier identifiable on at least one other computer on the Internet;
        ii) at least one of the one or more common identifiers comprises an identifier of a software installed on the Internet user's computer; and
        iii) the Internet user's computer is not in the possession or control of the Internet vendor;
    b) checking a data structure to see if the computer signature is stored in the data structure, and
        i) if the computer signature is not stored in the data structure, assigning, in the data structure, the Internet user's computer signature to a first geographical location by using at least a geographical location of a mobile voice device, wherein the mobile voice device and the Internet user's computer are in the possession and control of the Internet user; or
        ii) if the computer signature is stored in the data structure, determining a second geographical location of the mobile voice device of the Internet user; and comparing the first geographical location assigned to the computer signature with the second geographical location and
        iii) if the result of the comparison is within a predetermined acceptable distance value, providing to the internet user the ability to conduct a transaction.

2. The method of claim 1, wherein the computer signature is identified by identifying the computer comprising at least one common computer characteristic selected from the following list: Gateway MAC Address shared with other users, operating system version, Router MAC Address shared with other users, disk size, Internet browser version, common hardware installed on the computer, network card speed, operating system patches, CPU speed, memory size, virtual memory size, cookie, secret cookie, and common software installed on the computer, wherein each common characteristic of the at least one common characteristic comprises a non-unique identifier identifiable on at least one other computer on the Internet.

3. The method of claim 1, wherein:
    a) the mobile voice device comprises at least one of:
        1) Personal Digital Assistant ("PDA");
        2) mobile telephone;
        3) wireless communication device;
        4) device with wireless Internet capability; or
        5) mobile computer;
    b) the computer signature comprises at least one of:
        1) unique computer signature comprising at least one common software identifier;
        2) common software identifier;
        3) hardware network identifier shared with other users;
        4) few common computer identifier; or
        5) few common network identifier; or
    c) the computer signature is in any one of the following devices:
        1) the Internet user's computer;
        2) terminal;
        3) smart phone;
        4) PDA; or
        5) any device capable of communicating with the Internet.

4. The method of claim 1, wherein the computer signature can be identified by identifying the computer that is connected to the Internet and wherein the at least one common identifier comprises at least one of:
    a) a common identifier in the Internet user's computer hardware;

b) a common identifier in the Internet user's computer software;
c) a cookie;
d) an identifier in the Internet user's network device shared with other users;
e) one or more common software components in the Internet user's computer;
f) one or more common hardware components in the Internet user's computer;
g) Internet user gateway MAC address;
h) network card MAC address shared with other users;
i) combination of common identifiers comprising at least one of the Internet user's network characteristics and the Internet user's;
j) common identifier in the Internet user's computer;
k) network device characteristic shared with other users;
l) common software identifier;
m) hardware network identifier shared with other users;
n) combination of few common identifiers together to create one unique computer identifier;
o) any one or combination of the following, associated with the computer signature:
  i) Computer Network MAC address shared with other users;
  ii) Gateway or Router MAC Address shared with other users;
  iii) Operating system version;
  iv) Disk Size;
  v) Internet browser version;
  vi) common hardware information installed on the computer;
  viii) network card speed;
  ix) Operating system patches installed on the computer;
  x) CPU speed;
  xi) memory size;
  xii) cookie;
  xiii) secret cookie; and
  xiv) virtual memory size.

5. The method of claim 1, wherein the step of determining the location of the mobile voice device comprises use of at least one of the following systems:
a) Global Positioning Systems (GPS);
b) Galileo
c) WiMAX™
d) WiFi;
e) BLUETOOTH™;
f) MIMO;
g) UWB;
h) RFID;
i) Cellular triangulation;
j) Cellular base stations; or
k) Cellular antennas.

6. The method of claim 1 wherein the mobile voice device comprises is at least one of:
a) Personal Digital Assistant ("PDA");
b) mobile telephone;
c) wireless communication device;
d) device with wireless Internet capability; and
e) mobile computer.

7. The method of claim 1 wherein the computer signature is identified by identifying the computer that comprises the at least one common identifier, wherein each common identifier of the at least one common identifier comprises a non-unique identifier identifiable on at least one other computer on the Internet, the at least one common identifier comprising at least one of:
a) common software identifier;
b) hardware network identifier shared with other users;
c) common computer identifier; and
d) common network identifier.

8. The method of claim 1 wherein the computer signature can be in any one of the following devices:
a) the Internet user's computer;
b) terminal;
c) smart phone;
d) PDA; and
e) any device capable of communicating with the Internet.

9. A computer-implemented method of comparing a geographical location associated with an Internet user's computer signature with a geographical location of a mobile voice device of the Internet user, the method comprising the computer-implemented steps of:
a) determining a first geographical location using at least a geographical location of at least one mobile voice device of the Internet user;
b) identifying, while the Internet user is communicating with an Internet website of an Internet vendor, a computer signature of the Internet user's computer, wherein the computer signature comprises at least one common identifier installed on the computer, wherein:
  i) each common identifier of the one or more common identifiers comprises a non-unique identifier identifiable on at least one other computer on the Internet;
  ii) at least one identifier of the common identifiers comprises an identifier of a software installed on the Internet user's computer; and
  iii) the Internet user's computer is not in the possession or control of the Internet vendor;
c) assigning, in a data structure, a geographical location to the computer signature using at least the first geographical location, wherein the computer and the mobile voice device are in the possession and control of the Internet user;
d) receiving a request that originated from the Internet user, wherein the request includes the computer signature;
e) determining a second geographical location using at least one mobile voice device of the Internet user;
f) comparing the geographical location assigned to the received computer signature to the second geographical location.

10. The method of claim 9, wherein the computer signature is identified by identifying the computer comprising at least one common computer characteristic selected from the following list: Gateway MAC Address shared with other users, operating system version, Router MAC Address shared with other users, disk size, Internet browser version, common hardware installed on the computer, network card speed, operating system patches, CPU speed, memory size, virtual memory size, cookie, secret cookie, and common software installed on the computer, wherein each common characteristic of the at least one common characteristic comprises a non-unique identifier identifiable on at least one other computer on the Internet.

11. The method of claim 9 further comprising the step of determining if a result obtained by the comparing of the geographical location of the computer signature of the Internet user with the geographical location of the mobile voice device of the Internet user is within a predetermined distance value.

12. The method of claim 9 wherein:
a) the mobile voice device comprises at least one of:
  1) Personal Digital Assistant ("FDA");
  2) mobile telephone;
  3) wireless communication device;

4) device with wireless Internet capability; or
5) mobile computer;
b) the computer signature comprises at least one of:
   1) unique computer signature comprising at least one common software identifier;
   2) common software identifier;
   3) hardware network identifier shared with other users;
   4) few common computer identifier; or
   5) few common network identifier; or
c) the computer signature is in any one of the following devices:
   1) the Internet user's computer;
   2) terminal;
   3) smart phone;
   4) PDA; or
   5) any device capable of communicating with the Internet.

13. The method of claim 9, wherein the computer signature can be identified by identifying the computer that is connected to the Internet, and wherein the at least one common identifier comprising at least one of:
   a) a common identifier in the Internet user's computer hardware;
   b) a common identifier in the Internet user's computer software;
   c) a cookie;
   d) an identifier in the Internet user's network device shared with other users;
   e) one or more common software components in the Internet user's computer;
   f) one or more common hardware components in the Internet user's computer;
   g) Internet user gateway MAC address;
   h) network card MAC address shared with other users;
   i) combination of common identifiers comprising at least one of the Internet user's network characteristics and the Internet user's;
   j) common identifier in the Internet user's computer;
   k) network device characteristic shared with other users;
   l) common software identifier;
   m) hardware network identifier shared with other users;
   n) combination of few common identifiers together to create one unique computer identifier;
   o) any one or combination of the following, associated with the computer signature:
      i) Computer Network MAC address shared with other users;
      ii) Gateway or Router MAC Address shared with other users;
      iii) Operating system version;
      iv) Disk Size;
      v) Internet browser version;
      vi) common hardware information installed on the computer;
      viii) network card speed;
      ix) Operating system patches installed on the computer;
      x) CPU speed;
      xi) memory size;
      xii) cookie;
      xiii) secret cookie; and
      xiv) virtual memory size.

14. The method of claim 9, wherein the step of determining the location of the mobile voice device comprises use of at least one of the following systems:
   a) Global Positioning Systems (GPS);
   b) Galileo
   c) WiMAX™
   d) WiFi;
   e) BLUETOOTH™;
   f) MIMO;
   g) UWB;
   h) RFID;
   i) Cellular triangulation;
   j) Cellular base stations; or
   k) Cellular antennas.

15. The method of claim 9, wherein the mobile voice device comprises is at least one of:
   a) Personal Digital Assistant ("PDA");
   b) mobile telephone;
   c) wireless communication device;
   d) device with wireless Internet capability; and
   e) mobile computer.

16. The method of claim 9, wherein the computer signature is identified by identifying the computer that comprises at least the one common identifier, wherein each common identifier of the at least one common identifier comprises a non-unique identifier identifiable on at least one other computer on the Internet, the at least one common identifier comprising at least one of:
   a) common software identifier;
   b) hardware network identifier shared with other users;
   c) common computer identifier; and
   d) common network identifier.

17. The method of claim 9, wherein the computer signature can be in any one of the following devices:
   a) the Internet user's computer;
   b) terminal;
   c) smart phone;
   d) PDA; and
   e) any device capable of communicating with the Internet.

18. A computer-implemented method of making a geographical comparison between a location associated with a computer signature identified by identifying at least one common computer identifier and a geographical location associated with an Internet Protocol Address, the method comprising the computer-implemented steps of:
   a) determining a first geographical location using at least a geographical location of at least one mobile voice device of the Internet user;
   b) identifying, while the Internet user is communicating with an Internet website of an Internet vendor, a computer signature of the Internet user's computer by identifying a computer comprising at least one common identifier installed on the computer, wherein:
      i) each common identifier of the one or more common identifiers comprises a non-unique identifier identifiable on at least one other computer on the Internet;
      ii) at least one identifier of the common identifiers comprises an identifier of a software installed on the Internet user's computer; and
      iii) the Internet user's mobile voice device is not in the possession or control of the Internet vendor;
   c) assigning, in a data structure, a geographical location to the computer signature using at least the first geographical location, wherein the computer and the mobile voice device are in use by the Internet user;
   d) receiving a request that originated from the Internet user, wherein the request includes the computer signature and the Internet user's IP address;
   e) identifying the IP address geographical location;
   f) comparing the geographical location assigned to the received computer signature to the IP address geographical location.

19. The method of claim 18, wherein the computer signature is identified by identifying the computer comprising at least one common computer characteristic selected from the following list: Gateway MAC Address shared with other users, operating system version, Router MAC Address shared with other users, disk size, Internet browser version, common hardware installed on the computer, network card speed, operating system patches, CPU speed, memory size, virtual memory size, cookie, secret cookie, and common software installed on the computer, wherein each common characteristic of the at least one common characteristic comprises a non-unique identifier identifiable on at least one other computer on the Internet.

20. The method of claim 18 further comprising the step of determining if a result obtained by the comparing of the geographical location of the computer signature of the Internet user with the geographical location of the mobile voice device of the Internet user is within a predetermined distance value.

21. The method of claim 18 wherein:
 a) the mobile voice device comprises at least one of:
  1) Personal Digital Assistant ("FDA");
  2) mobile telephone;
  3) wireless communication device;
  4) device with wireless Internet capability; or
  5) mobile computer;
 b) the computer signature comprises at least one of:
  1) unique computer signature comprising at least one common software identifier;
  2) common software identifier;
  3) hardware network identifier shared with other users;
  4) few common computer identifier; or
  5) few common network identifier; or
 c) the computer signature is in any one of the following devices:
  1) the Internet user's computer;
  2) terminal;
  3) smart phone;
  4) PDA; or
  5) any device capable of communicating with the Internet.

22. The method of claim 18, wherein the computer signature can be identified by identifying the computer that is connected to the Internet, and wherein the at least one common identifier comprising at least one of:
 a) a common identifier in the Internet user's computer hardware;
 b) a common identifier in the Internet user's computer software;
 c) a cookie;
 d) an identifier in the Internet user's network device shared with other users;
 e) one or more common software components in the Internet user's computer;
 f) one or more common hardware components in the Internet user's computer;
 g) Internet user gateway MAC address;
 h) network card MAC address shared with other users;
 i) combination of common identifiers comprising at least one of the Internet user's network characteristics and the Internet user's;
 j) common identifier in the Internet user's computer;
 k) network device characteristic shared with other users;
 l) common software identifier;
 m) hardware network identifier shared with other users;
 n) combination of few common identifiers together to create one unique computer identifier;
 o) any one or combination of the following, associated with the computer signature:
  i) Computer Network MAC address shared with other users;
  ii) Gateway or Router MAC Address shared with other users;
  iii) Operating system version;
  iv) Disk Size;
  v) Internet browser version;
  vi) common hardware information installed on the computer;
  viii) network card speed;
  ix) Operating system patches installed on the computer;
  x) CPU speed;
  xi) memory size;
  xii) cookie;
  xiii) secret cookie; and
  xiv) virtual memory size.

23. The method of claim 18, wherein the step of determining the location of the mobile voice device comprises use of at least one of the following systems:
 a) Global Positioning Systems (GPS);
 b) Galileo
 c) WiMAX™
 d) WiFi;
 e) BLUETOOTH™;
 f) MIMO;
 g) UWB;
 h) RFID;
 i) Cellular triangulation;
 j) Cellular base stations; or
 k) Cellular antennas.

24. The method of claim 18, wherein the mobile voice device comprises is at least one of:
 a) Personal Digital Assistant ("PDA");
 b) mobile telephone;
 c) wireless communication device;
 d) device with wireless Internet capability; and
 e) mobile computer.

25. The method of claim 18, wherein the computer signature is identified by identifying a computer that comprises the at least one common identifier, the at least one common identifier comprising at least one of:
 a) common software identifier;
 b) hardware network identifier shared with other users;
 c) common computer identifier; and
 d) common network identifier.

26. The method of claim 18, wherein the computer signature can be in any one of the following devices:
 a) the Internet user's computer;
 b) terminal;
 c) smart phone;
 d) PDA; and
 e) any device capable of communicating with the Internet.

27. A computer-implemented method of making a geographical comparison between a location associated with a computer signature and a geographical location of a router in path to an Internet user's IP address, the method) comprising the computer-implemented steps of:
 a) identifying, while the Internet user is communicating with an Internet website of an Internet vendor, the computer signature, wherein:
  i) the computer signature is identified by identifying a computer comprising at least one common identifier;

ii) each common identifier of the at least one common identifier comprises a non-unique identifier identifiable on at least one other computer on the Internet; and iii) at least one identifier of the at least one common identifier comprises an identifier of at least one software installed on the computer; and iv) the Internet user's computer is not in the possession or control of the Internet vendor;

b) assigning, in a data structure, the location of at least a mobile voice device to the computer signature;

c) receiving a request that originated from the Internet user, wherein the request includes the computer signature and an IP Address in use by the Internet user;

d) determining an IP address of a router in a path to the IP address in use by the Internet user;

e) determining the geographical location of the router in the path to the IP address in use by the Internet user; and f) comparing the geographical location of the router in the path to the IP address in use by the Internet user with the location associated with the computer signature.

28. The method of claim 27, wherein the computer signature is identified by identifying the computer comprising at least one common computer characteristic selected from the following list: Gateway MAC Address shared with other users, operating system version, Router MAC Address shared with other users, disk size, Internet browser version, common hardware installed on the computer, network card speed, operating system patches, CPU speed, memory size, virtual memory size, cookie, secret cookie, and common software installed on the computer, wherein each common characteristic of the at least one common characteristic comprises a non-unique identifier identifiable on at least one other computer on the Internet.

29. The method of claim 27 further comprising the step of determining if a result obtained by the comparing of the geographical location of the computer signature of the Internet user with the geographical location of the mobile voice device of the Internet user is within a predetermined distance value.

30. The method of claim 27 wherein:
a) the mobile voice device comprises at least one of:
   1) Personal Digital Assistant ("FDA");
   2) mobile telephone;
   3) wireless communication device;
   4) device with wireless Internet capability; or
   5) mobile computer;
b) the computer signature comprises at least one of:
   1) unique computer signature comprising at least one common software identifier;
   2) common software identifier;
   3) hardware network identifier shared with other users;
   4) few common computer identifier; or
   5) few common network identifier; or
c) the computer signature is in any one of the following devices:
   1) the Internet user's computer;
   2) terminal;
   3) smart phone;
   4) PDA; or
   5) any device capable of communicating with the Internet.

31. The method of claim 27, wherein the computer signature can be identified by identifying the computer that is connected to the Internet, and wherein the at least one common identifier comprising at least one of:

a) a common identifier in the Internet user's computer hardware;
b) a common identifier in the Internet user's computer software;
c) a cookie;
d) an identifier in the Internet user's network device shared with other users;
e) one or more common software components in the Internet user's computer;
f) one or more common hardware components in the Internet user's computer;
g) Internet user gateway MAC address;
h) network card MAC address shared with other users;
i) combination of common identifiers comprising at least one of the Internet user's network characteristics and the Internet user's;
j) common identifier in the Internet user's computer;
k) network device characteristic shared with other users;
l) common software identifier;
m) hardware network identifier shared with other users;
n) combination of few common identifiers together to create one unique computer identifier;
o) any one or combination of the following, associated with the computer signature:
   i) Computer Network MAC address shared with other users;
   ii) Gateway or Router MAC Address shared with other users;
   iii) Operating system version;
   iv) Disk Size;
   v) Internet browser version;
   vi) common hardware information installed on the computer;
   viii) network card speed;
   ix) Operating system patches installed on the computer;
   x) CPU speed;
   xi) memory size;
   xii) cookie;
   xiii) secret cookie; and
   xiv) virtual memory size.

32. The method of claim 27, wherein the step of determining the location of the mobile voice device comprises use of at least one of the following systems:
a) Global Positioning Systems (GPS);
b) Galileo
c) WiMAX™
d) WiFi;
e) BLUETOOTH™;
f) MIMO;
g) UWB;
h) RFID;
i) Cellular triangulation;
j) Cellular base stations; or
k) Cellular antennas.

33. The method of claim 27, wherein the mobile voice device comprises is at least one of:
a) Personal Digital Assistant ("PDA");
b) mobile telephone;
c) wireless communication device;
d) device with wireless Internet capability; and
e) mobile computer.

34. The method of claim 27, wherein the computer signature is identified by identifying a computer that comprises at least one common identifier, wherein each common identifier of the at least one common identifier comprises a non-unique identifier identifiable on at least one other computer on the Internet, the at least one common identifier comprising at least one of:

a) common software identifier;
   b) hardware network identifier shared with other users;
   c) common computer identifier; and
   d) common network identifier.

35. The method of claim 27, wherein the computer signature can be in any one of the following devices:

a) the Internet user's computer;
   b) terminal;
   c) smart phone;
   d) PDA; and
   e) any device capable of communicating with the Internet.

\* \* \* \* \*